United States Patent
Fernando

(10) Patent No.: US 8,462,156 B1
(45) Date of Patent: Jun. 11, 2013

(54) METHOD AND SYSTEM FOR GENERATING SHADOWS IN A GRAPHICS PROCESSING UNIT

(75) Inventor: Pemith Randima Fernando, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 327 days.

(21) Appl. No.: 11/317,124

(22) Filed: Dec. 22, 2005

(51) Int. Cl.
*G06T 15/50* (2011.01)
*G06T 15/60* (2006.01)

(52) U.S. Cl.
USPC .......................... 345/426; 345/419; 345/421

(58) Field of Classification Search
None
See application file for complete search history.

(56) References Cited

U.S. PATENT DOCUMENTS

| | | |
|---|---|---|
| 5,268,996 A | 12/1993 | Steiner et al. |
| 5,490,240 A | 2/1996 | Foran et al. |
| 5,616,031 A * | 4/1997 | Logg .............................. 434/38 |
| 5,737,031 A * | 4/1998 | Tzidon et al. ................. 348/587 |
| 5,742,292 A | 4/1998 | Murata |
| 5,742,749 A | 4/1998 | Foran et al. |
| 5,767,858 A | 6/1998 | Kawase et al. |
| 5,805,782 A | 9/1998 | Foran |
| 5,880,736 A | 3/1999 | Peercy et al. |
| 5,999,185 A | 12/1999 | Kato et al. |
| 6,034,691 A | 3/2000 | Aono et al. |
| 6,078,332 A | 6/2000 | Ohazama |
| 6,208,361 B1 | 3/2001 | Gossett |
| 6,252,608 B1 | 6/2001 | Snyder et al. |
| 6,774,895 B1 | 8/2004 | Papakipos et al. |
| 6,876,362 B1 | 4/2005 | Newhall, Jr. et al. |
| 6,903,741 B2 | 6/2005 | Corbetta |
| 7,508,390 B1 | 3/2009 | Demers |
| 2004/0239673 A1 | 12/2004 | Schmidt |
| 2006/0044322 A1 * | 3/2006 | Chen et al. .................... 345/593 |

OTHER PUBLICATIONS

Fernando, P., Adaptive Techniques for Hardware Shadow Generation, May 2002, Master Thesis, Cornell University, pp. ix-xiii, 1-94.*
Reeves, W., Salesin, D., Cook, R., Rendering Antialiased Shadows with Depth Maps, Jul. 1987, ACM SIGGRAPH '87, vol. 21, No. 4, pp. 283-291.*
Mitchell, J., 3.0 Shaders, Mar. 2005, Game Developers Conference, http://ati.amd.com/developer/gdc/D3DTutoria101_3_0_Shaders. pdf, pp. 1-41.*
Nealen, Andrew, Shadow Mapping and Shadow Volumes, Jan. 1, 2005, http://www.devmaster.net/articles/shadow_techniques/, pp. 1-10.*
Pagot, C., Comba, J., Neto, M., Multiple-Depth Shadow Maps, 2004, Proceedings of the XVII Brazilian Symposium on Computer Graphics and Image Processing, SIBGRAPI '04, pp. 1-8.*

(Continued)

*Primary Examiner* — Said Broome

(57) ABSTRACT

A method and system for generating shadows for a graphics processing unit. Specifically, the method determines whether a potential blocker occludes light from reaching a point of a scene in an image space. The light is generated from a light source. A width of a corresponding penumbra is determined for the point. The width is based on a width of the light source, a depth of the potential blocker from the light source, and a depth of a receiver from the light source. The receiver includes the point. A percentage closer filtering kernel size is scaled in proportion to the width of the corresponding penumbra. Thereafter, percentage closer filtering is performed for the point using the kernel size that is scaled in order to shade a pixel corresponding to the point.

18 Claims, 9 Drawing Sheets

OTHER PUBLICATIONS

Hasenfratz, J., Lapierre, M., Holzschuch, N., Sillion, F., A Survey of Real-time Soft Shadows Algorithms, Dec. 2003, Eurographics, Computer Graphics Forum, vol. 22, No. 4, pp. 753-774.*
Ronald Frazier; "Real-Time Per-Pixel Point Lights and Spot Lights in OpenGL"; Sep. 13, 2000.
Ronald Frazier; "Advanced Real-Time Per-Pixel Point Lights and Spot Lights in OpenGL"; Sep. 13, 2000.
Ronald Frazier; "Index Cube Shadow Mapping in OpenGL"; Sep. 13, 2000.
"Computer Graphics Principles and Practices", by J. Foley and A. Van Dam, 2nd Edition.
"Computer Graphics", by Donald Hearn and M. Pauline Baker, 2nd Edition, 1994.
"Direct Volume Rendering with Shading via Three-Dimensional Textures" by Gelder and Kim, IEEE, 1996.
"Vertex Shader Shadow Volume" NVIDIA Effect Browser.
Agrawala et al., Efficient Image-Based Methods for Dendering Soft Shadows, pp. 375-384.
Bergeron; A General Version of Crow's Shadow Volumes; IIEEE Interactive Computer Graphics and Application; Sep. 1986.
Blin; Me and My (Fake) Shadow, pp. 82-86.
Crow; Shadow Algorithms for Computer Graphics; pp. 242-248.
Diefenbach; "Pipeline Rendering: Interactive Refractions, Reflections, and Shadows"; pp. 173-180.
Dietrich, "Shadow Techniques", GDC 2001 Presentation, before Apr. 3, 2002.
Heckbert et al., Simulating Soft Shadows with Graphics Hardware; Technical Report CMU-CS-97-104.
Hubert, Casting Shadows on Volumes; Game Developer, vol. 6.
Kilgard., 'Improving Shadows and Reflection via the Stencil Buffer', www.nvidia.com/developer.
Parker et al.; Single Sample Soft Shadows.
Sander et al., "Silhouette Clipping"; pp. 327-334.
Udeshi et al., "Towards Interactive Photorealistic Rendering of Indoor Scenes: A Hybrid Approach" pp. 63-76.
Watt et al., Advanced Animation and Rendering Techniques Theory and Practice, pp. 155-177.
Williams; "Casting Curvered Shadows on Curved Surfaces".
Wynn et al., "CubeMaps", www.nvidia.com/developer.
Schrocker, "Hardware Accelerated Per-Pixel Shading", Feb. 27, 2002. Graz University of Technology Institute for Computer Graphics and Vision, pp. 1-18.

* cited by examiner

700a

METHOD AND SYSTEM FOR GENERATING SHADOWS IN A GRAPHICS PROCESSING UNIT

FIELD OF THE INVENTION

Embodiments of the present invention relate to graphics processing units. More specifically, embodiments of the present invention relate to a method and system for generating shadows in a graphics processing unit.

BACKGROUND ART

Shadowing of objects in a graphical image is important to provide valuable cues about the relationship between objects. For instance, the shadow of an object becomes much harder or sharper as the object contacts another object (e.g., the floor). Correspondingly, the shadow of the object becomes softer as the object moves away from other objects.

One of the fundamental problems in computer graphics is generating accurate soft shadows from area light sources in an efficient manner. More particularly, generating accurate soft shadows requires the generation of accurately depicted penumbras that transition away from the solid, dark area of the umbra. Conventional techniques are either too computationally expensive, or do not accurately depict the penumbra of the shadow, thereby limiting the use of these conventional techniques in developing graphical applications.

One standard technique is to determine all the rays of light from an area light source that would reach a particular point in image space. This results in an accurate description of the fraction of light from the light source that reaches the particular point. However, this method is computationally expensive, especially as the scene becomes more complex and screen resolution increases. As such, generation of shadows in real-time is severely limited.

Another conventional technique implements the use of hard shadows for every shadow that is generated. That is, the shadow effectively does not exhibit a penumbra, and thus is not capable of exhibiting soft shadowing effects. This technique however, is unable to distinguish when objects are closely located but not touching.

Still another conventional technique uniformly softens the shadow through uniform penumbras. However this technique, while visually more pleasing is unable to indicate when two objects are actually touching.

As such, conventional techniques for generating shadows are either computationally expensive, or are able to generate shadowing effects quickly but not accurately. Thus what is needed is the efficient generation of shadowing effects that is not computationally expensive but is still accurate.

SUMMARY OF THE INVENTION

Accordingly, the present invention provides, in various embodiments, a method and system for generating shadows from area light sources in a graphics processing unit. Embodiments of the present invention take advantage of the observation that as the size of percentage closer filtering kernel increases, the resulting shadows become softer. As such, embodiments of the present invention are capable of scaling the percentage closer filtering kernel size to generate accurate shadows depending on a calculated size of a corresponding penumbra through a combination of shadow mapping and percentage closer filtering techniques.

Embodiments of the present invention are capable of efficiently generating perceptually accurate soft shadows. Other embodiments of the present invention are capable of generating shadows based on a single light source sample, or a single shadow map. Still other embodiments are seamlessly integrated with graphics processing units since additional pre-processing, post-processing, and geometry generation are not required over traditional graphics generation techniques. As such, embodiments of the present invention embody the same advantages as traditional shadow mapping in that shadow generation is independent of scene complexity being based on image space, and is capable of integrating with other graphics techniques, such as alpha testing, displacement mapping, etc.

Specifically, a method and computer implemented system are described for generating shadows for a graphics processing unit in embodiments of the present invention. The method determines whether a potential blocker occludes light from reaching a point of a scene in an image space. The light is generated from a light source. A width of a corresponding penumbra is determined for the point. The width is based on a width of the light source, a depth of the potential blocker from the light source, and a depth of a receiver from the light source. The receiver includes the point. A percentage closer filtering kernel size is scaled in proportion to the width of the corresponding penumbra. Thereafter, percentage closer filtering is performed for the point using the kernel size that is scaled in order to shade a pixel corresponding to the point.

Another embodiment of the present invention describes a method of generating shadows in which a shadow map is generated corresponding to a point of a scene in an image space. For each texel in a region of the shadow map, a depth value is determined. The depth value indicates whether light generated from a light source is occluded by a potential blocker. Depth values for the region that indicate the light is occluded are averaged to generate an average depth of the potential blocker. A width of a corresponding penumbra is determined based on the width of the light source, the average depth of the potential blocker, and a depth of a receiver of the light that includes the point. Thereafter, percentage closer filtering is performed to shade a pixel corresponding to the point using a kernel size that is proportional to the size of the corresponding penumbra.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE INVENTION

Figure 1:
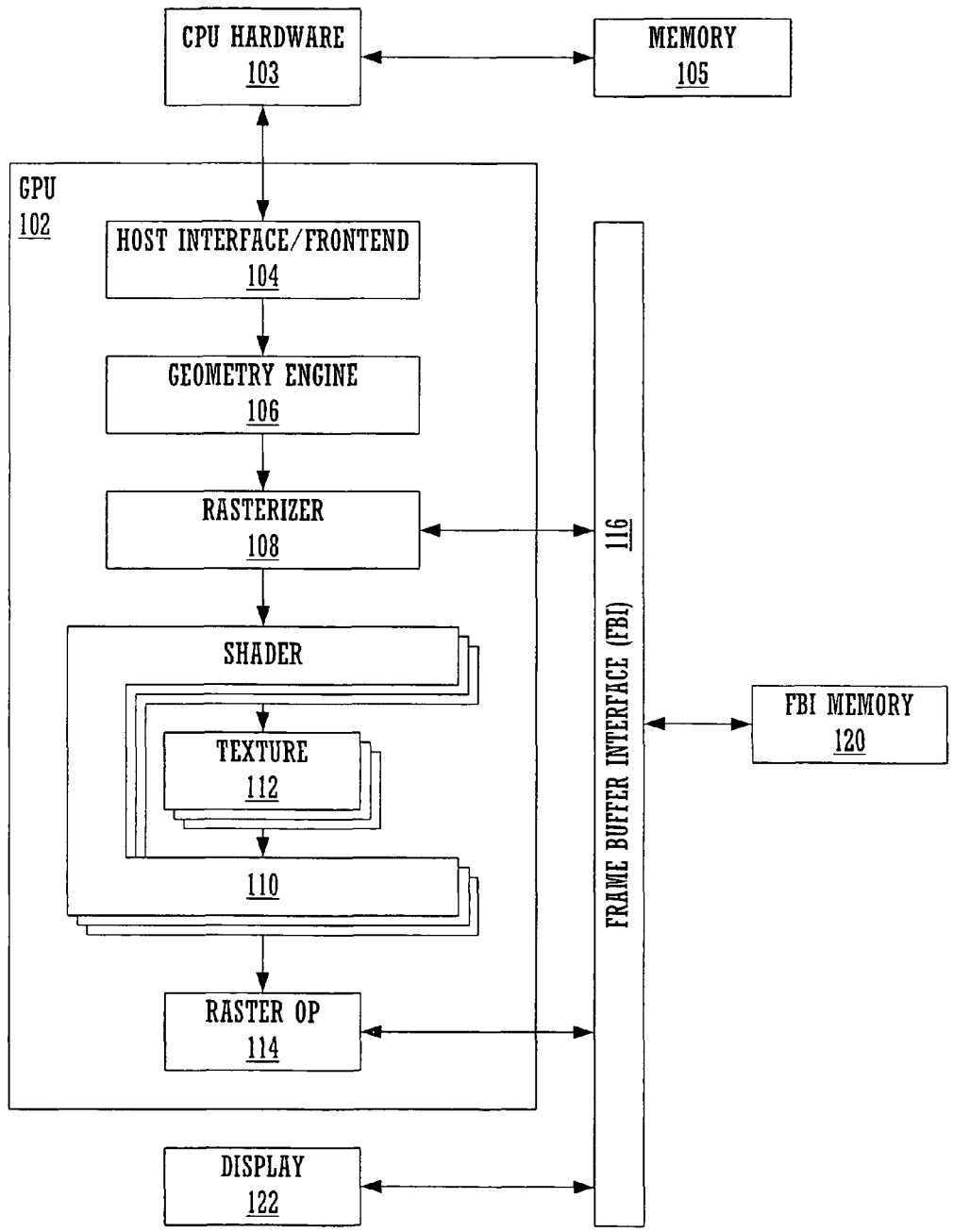
FIG. 1 shows a diagram depicting the various stages of an exemplary graphics processing unit pipeline, in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

In general, embodiments of the present invention are capable of generating soft shadows in a graphics processing unit (GPU), where the GPU includes a 3-D graphics pipeline. As a result, the present invention provides a method for generating perceptually accurate soft shadows that is based on shadow mapping and percentage-closer filtering (PCF) techniques, in embodiments of the present invention. As such, embodiments of the present invention encompass the advantages of shadow mapping techniques, such as being independent of geometric complexity since it is based in image space, integrating nicely with other graphics techniques (e.g., alpha testing, displacement mapping, etc.), using a single shadow map and one shader, and requirement no pre or post processing over conventional shading techniques. Embodiments of the present invention and their benefits are further described below.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," or "calculating," or "scaling," or "performing," or "generating," or the like, refer to the action and processes of a computer system (e.g., computer system 200 of FIG. 2), or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention are implemented within a GPU. That is, the GPU is capable of providing shading for pixels representing a scene in image space. Graphics processing include important features of modern high performance computing systems. GPUs are specialized integrated circuit devices that are commonly used in graphics systems to accelerate the performance of a 3-D rendering application. GPUs are commonly used in conjunction with a central processing unit (CPU) to generate three-dimensional images for one or more applications executing on a computer system. Modern GPUs typically utilize a graphics pipeline for processing data.

In graphics processing, mathematical procedures are implemented to render, or draw, graphic primitives, e.g., a triangle or a rectangle, on a display to produce desired visual images. The rendering of three-dimensional graphical images is of interest in a variety of television video display, electronic games, and other applications. Rendering is the general term that describes the overall multi-step process of transitioning from a database representation of a three-dimensional object to a two-dimensional projection of the object onto a viewing surface, e.g., computer display, television set.

FIG. 1 illustrates a simplified block diagram of an exemplary graphics system 100 that includes a graphics processing unit 102. As shown, the graphics processing unit 102 has a host interface/front end 104 that receives raw graphics data from central processing hardware 103 that is executing an application program stored in memory 105. The host interface/front end 104 buffers input information and supplies that information to a geometry engine 106 that outputs 2-dimensional frame buffer coordinates.

The 2 dimensional co-ordinates of the vertices of the graphics primitives are supplied to a rasterizer 108 to determine the positions of all of the pixels within the graphics primitives as rasterized pixel data. The rasterized pixel data are applied to a shader 110 that adds texture, color, and optical features related to fog and illumination to the rasterized pixel data to produce shaded pixel data. The shader 110 includes a texture engine 112 that modifies the rasterized pixel data to have desired texture and optical features. The shader 110 is capable of implementing the features of the present invention to provide perceptually accurate soft shadows using shadow mapping and percentage-closer filtering techniques.

The shaded pixel data is input to a Raster Operations Processor 114 that performs color blending on the shaded pixel data. The result from the Raster Operations Processor 114 is frame pixel data that is stored in a frame buffer memory 120 by a frame buffer interface 116. The frame pixel data can be used for various processes such as being displayed on a display 122. Frame pixel data can be made available as required by way of the frame buffer interface 116.

Figure 2:
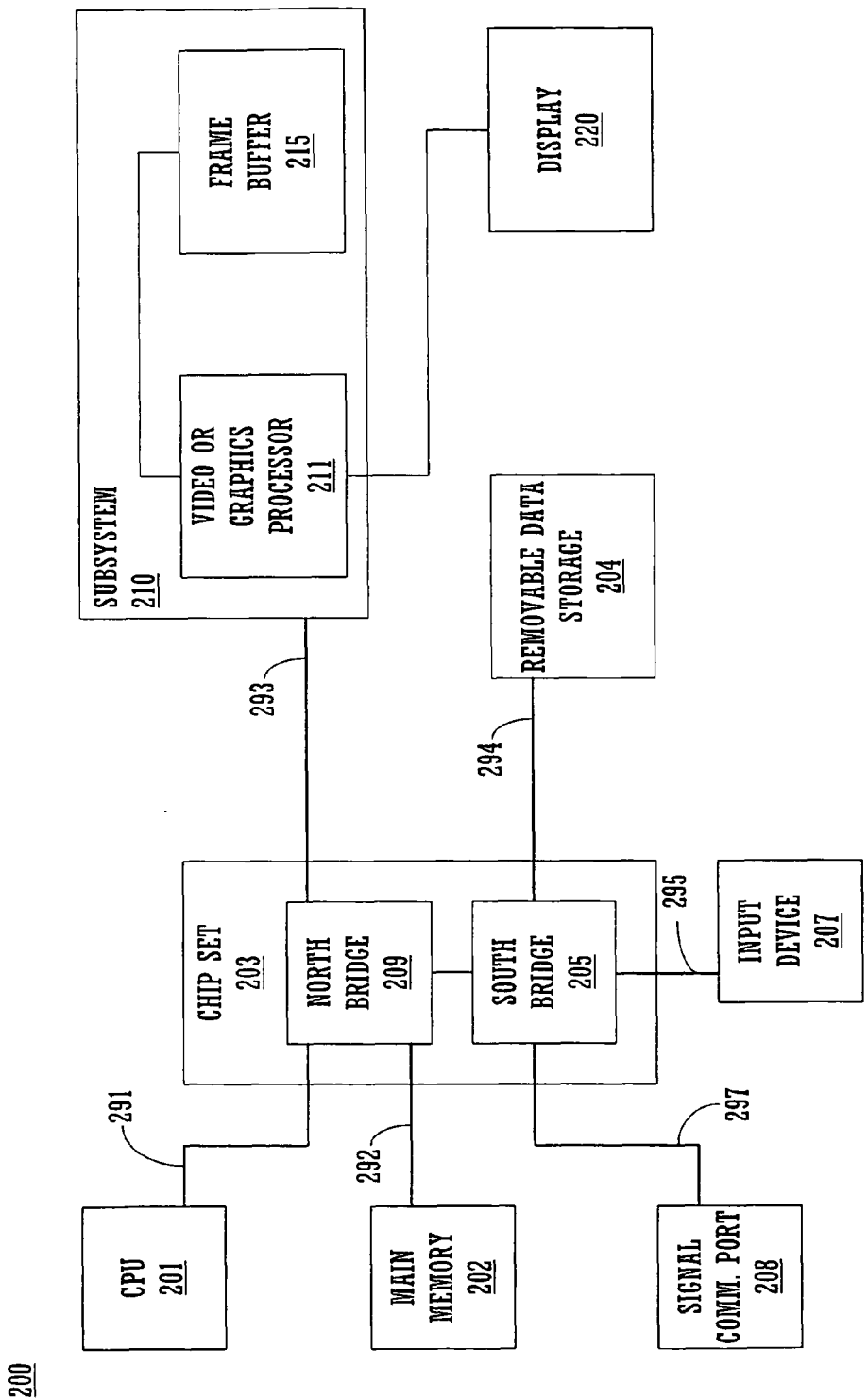
FIG. 2 is a block diagram of a computer system in which embodiments of the present invention can be implemented, in accordance with one embodiment of the present invention.

Computer System Platform:

With reference now to FIG. 2, a block diagram of an exemplary computer system 200 is shown upon which embodiments of the present invention can be implemented, in accordance with one embodiment of the present invention. Computer system 200 includes central processor unit 201, main memory 202 (e.g., random access memory), chip set 203 with north bridge 209 and south bridge 205, removable data storage device 204, input device 207, signal communications port 208, and graphics subsystem 210 which is coupled to display 220.

Computer system 200 includes several buses for communicatively coupling the components of computer system 200. Communication bus 291 (e.g., a front side bus) couples north bridge 209 of chipset 203 to central processor unit 201. Communication bus 293 (e.g., the Advanced Graphics Port interface) couples north bridge of chipset 203 to video or graphics subsystem 210. Communication buses 294-297 (e.g., PCI bus) couple south bridge 205 of chip set 203 to removable data storage device 204, input device 207, signal communications port 208, respectively. In addition, the main memory 202 is coupled to the north bridge 209 via a point to point connection 292 between the memory controller on the north bridge 209 and the dynamic random access memory (DRAM).

The components of computer system 200 cooperatively operate to provide versatile functionality and performance. The operating characteristics of functional components included in computer system 200 can change dynamically. In one exemplary implementation, the components of computer system 200 cooperatively operate to provide predetermined types of functionality, even though some of the functional components included in computer system 200 may be defective. Communications bus 291, 293, 294, 295 and 297 communicate information. Central processor 201 processes information. Main memory 202 stores information and instructions for the central processor 201. Removable data storage device 204 also stores information and instructions (e.g., functioning as a large information reservoir). Input device 207 provides a mechanism for inputting information and/or for pointing to or highlighting information on display 220. Signal communication port 208 provides a communication interface to exterior devices (e.g., an interface with a network). Display device 220 displays information in accordance with data stored in frame buffer 215. Video or graphics processor 211 processes video or graphics commands from central processor 201 and provides the resulting data to frame buffers 215 for storage and retrieval by display monitor 220.

The operational configurations of the functional components included in computer system 200 are flexibly adaptable to meet a variety of objectives. For example, operational configurations of the functional components included in computer system 200 are configurable to maintain execution of a type of function even if some of the functional components are disabled. In one exemplary implementation, central processor 201 and graphics processor 211 are still capable of executing the same type of processing functions and main memory 202 stores information even though some of the functional components (e.g., floating point component, pixel shader component, memory cell component, etc) are disabled. In one embodiment, the processors include a plurality of functional components for performing processing operations. The operational characteristics of the functional components can be altered. In one embodiment, the processors include a plurality of functional components for performing processing operations, wherein defective functional components included in the plurality of functional components are disabled. The processors also include a workflow control component for dispensing workflow to enabled processing components and preventing distribution of workflow to the disabled defective components. In one exemplary implementation, computer system 200 can continue to provide full functionality even though the functionality may be provided at a reduced performance level (e.g., slower).

Figure 3:
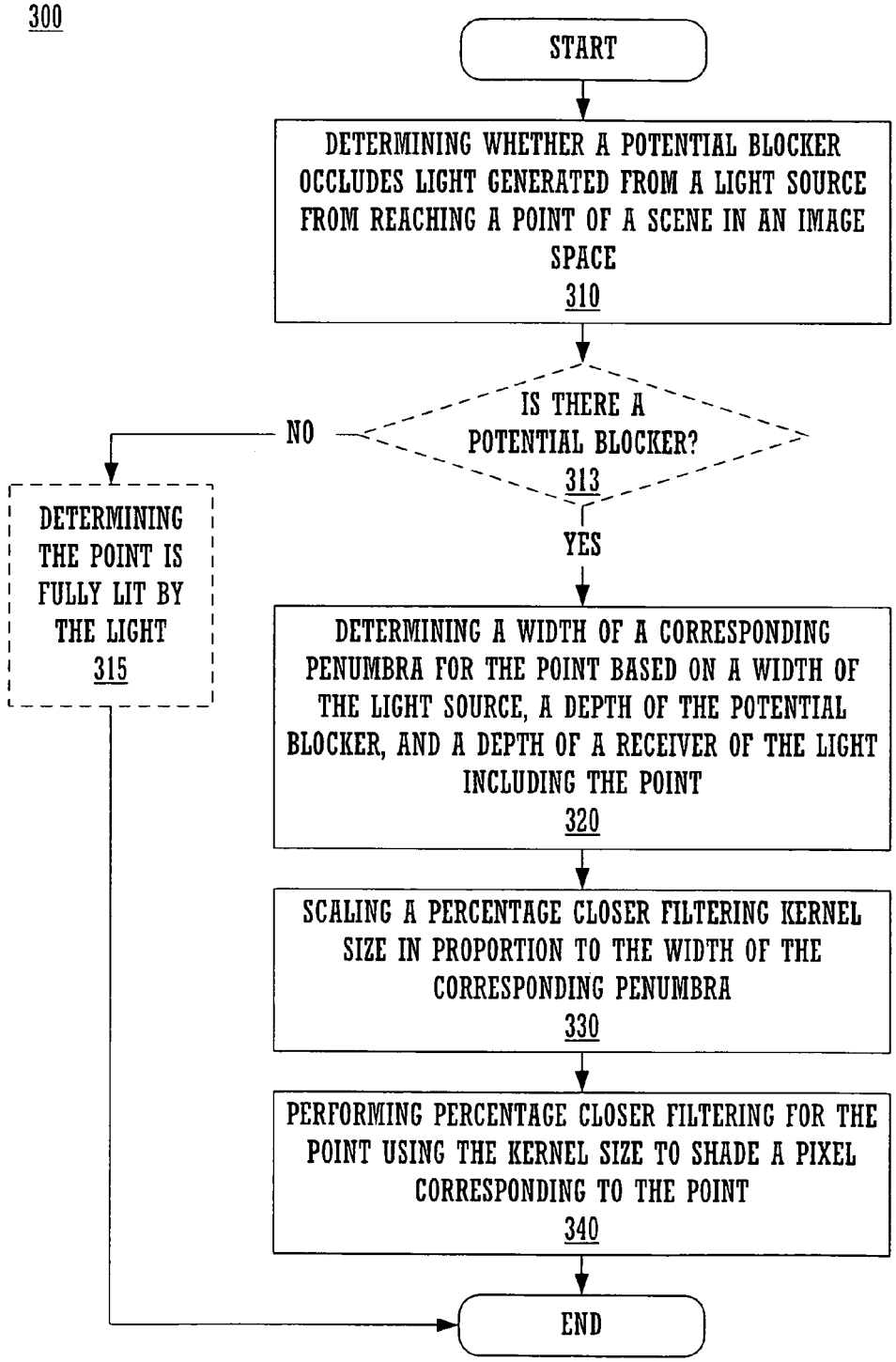
FIG. 3 is a flow chart illustrating steps in a computer implemented method for generating shadows in a graphics processing unit, in accordance with one embodiment of the present invention.

Method and System for Generating Shadows in a GPU:

FIG. 3 is a flow chart illustrating steps in a computer implemented method for generating shadows in a GPU, in accordance with one embodiment of the present invention. The present embodiment presents a new method, hereinafter referred to as Percentage-Closer Soft Shadows (PCSS), that is capable of generating perceptually accurate soft shadows. The PCSS technique of the present embodiment seamlessly replaces traditional shadow mapping techniques, but embodies many of the same advantages as traditional shadow mapping, such as being independent of scene complexity, working with alpha testing and displacement testing, etc. As such, the present embodiment is capable of generating accurate soft shadows in real-time.

Figure 4:
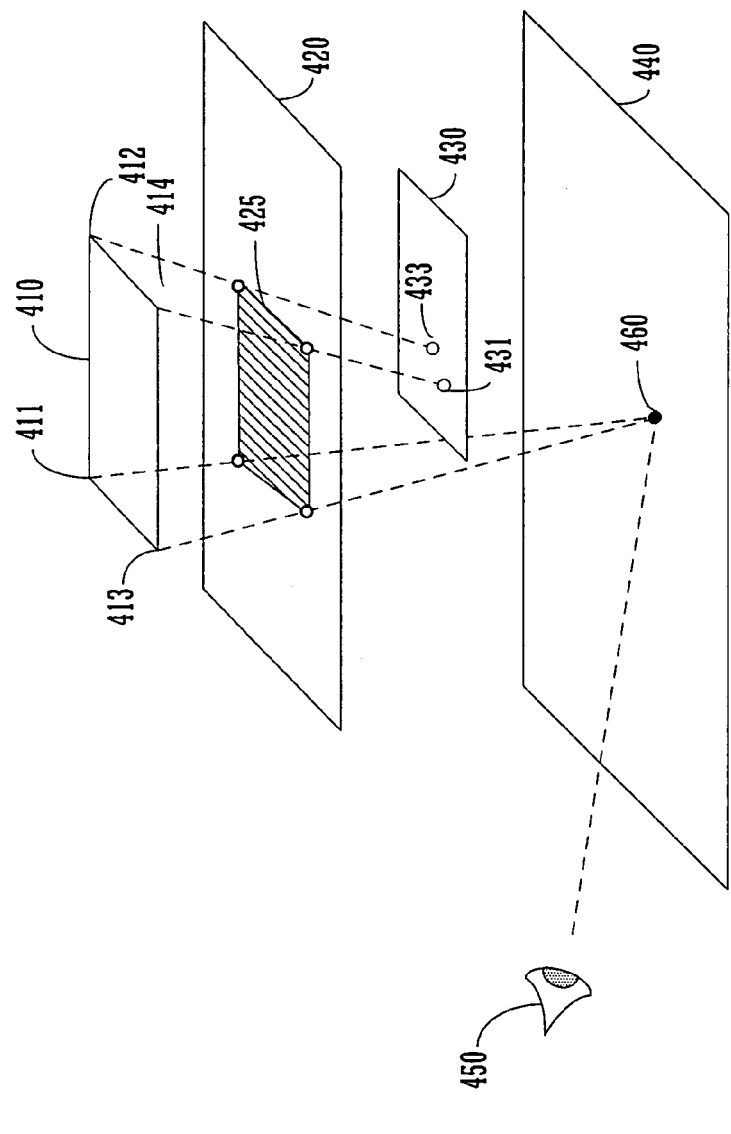
FIG. 4 is diagram illustrating the generation of a blocker depth value for a point in a scene in image space, in accordance with one embodiment of the present invention.

At 310, the present embodiment determines whether a potential blocker occludes light that is generated from a light source. That is, the present embodiment determines whether light is blocked from reaching a point of a scene in an image space. FIG. 4 illustrates the relationship between the light source, the blocker, and the receiver, as is described more fully below.

At 313 an optional decision step is performed that determines if there is a potential blocker. If no potential blocker exists, then all of the light from the light source (e.g., source 410) would reach the point in the scene. As such, the present embodiment determines the point is fully lit, and need not perform the filtering operations of 320, 330, and 340. As such, the present embodiment skips operations 320, 330 and 340.

Figure 5:
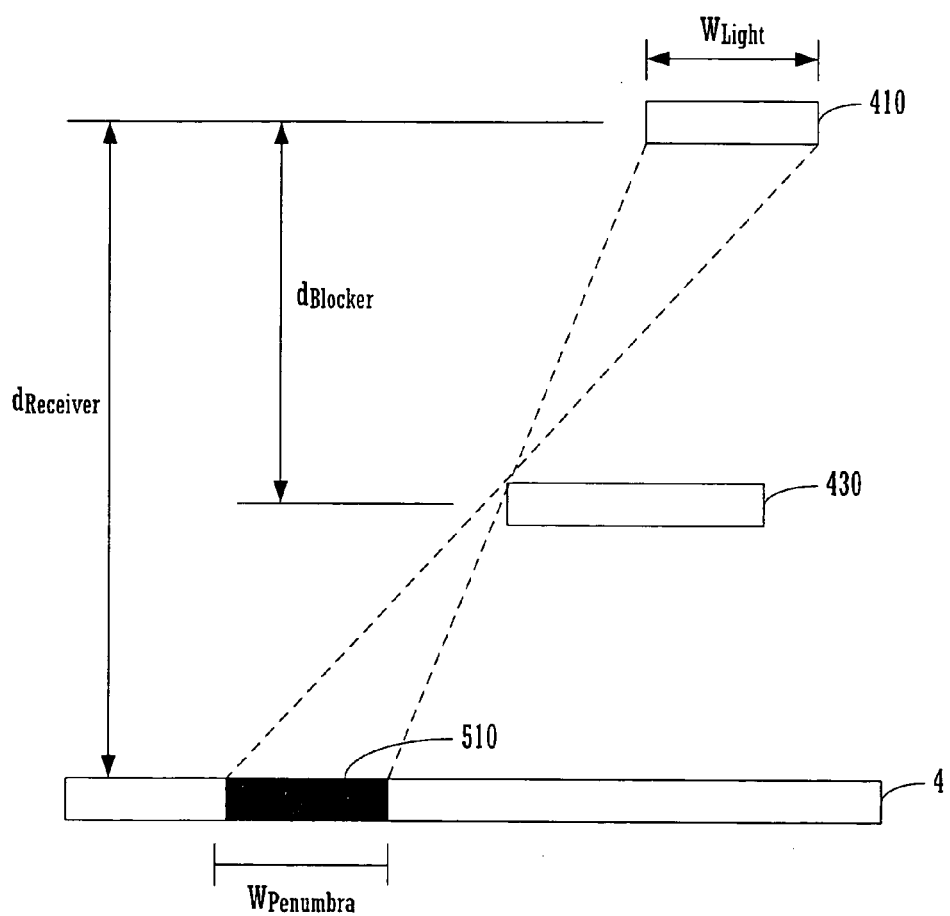
FIG. 5 is a diagram illustrating the calculation of the width of a penumbra corresponding to a point in a scene in image space, in accordance with one embodiment of the present invention.

On the other hand, if at 313 it is determined that there is a potential blocker, then the present embodiment proceeds to 320 to determine a width of a corresponding penumbra as represented in a pixel displaying the point. The width of the corresponding penumbra is determined as a function of the width of the light source, a depth of the potential blocker, and a depth of the receiver containing the point. FIG. 5 illustrates the relationship between the light source, any potential blocker, and the receiving point in calculating the width of a corresponding penumbra.

At 330, the present embodiment scales a percentage closer filtering (PCF) kernel size in proportion to the width of the corresponding penumbra. The present embodiment takes advantage of the observation that as the size of the PCF kernel size increases, the resulting shadows become softer. Embodiments of the present invention are able to determine how much variation in the filter size is needed to accurately achieve the correct degree of softness in a shadow. That is, as the width of the penumbra increases, the PCF kernel size also scales accordingly by increasing. Also, as the width of the penumbra decreases, the PCF kernel size also scales accordingly by decreasing.

At 340, the present embodiment performs percentage closer filtering for the point using the kernel size correctly scaled to accurately shade the pixel displaying the point. That is, the technique is capable of returning a floating point value that indicates the amount of shadowing for each pixel displaying a scene in an image space. As a result, the process in FIG. 3 is repeated for every pixel on a display that is showing the scene.

FIG. 4 is a diagram illustrating the relationships of a blocker, a light source, and a receiving point in a receiver. As shown in FIG. 4, an area light source 410 generates light that is projected onto a receiving point 460 in a receiver 440. The light may be occluded in relation to the point 460. That is, rays of light from the area light source 410 may be blocked from reaching the point 460. FIG. 4 is a further illustration of the operation 310 of FIG. 3.

In particular, the surface of the blocker 430 is presented between the area light source 410 and the receiver 440. Rays of light from the area light source 410 may or may not be occluded in relation to the receiving point 460. As shown in FIG. 4, the rays of light are projected down in a space defined by lines drawn between points 411 and 460, 412 and 460, 413 and 460, and 414 and 460. This space represents all of the rays that could potentially reach the point 460 if not occluded.

As shown in FIG. 4, a surface of a blocker 430 is defined. The surface of the blocker 430 may occlude the light from the light source 410. As such, all of the light from the light source 410 may not reach the point 460. For instance, points 433 and 431 show intersection points where rays emanating from point 412 and 414 of the light source 410 are blocked from reaching the point 460 in the receiver. As such, part of the light source 410 is occluded from the point 460.

Moreover, FIG. 4 illustrates the process for performing a blocker search. That is, FIG. 4 illustrates how 310 of FIG. 3 is implemented in accordance with one embodiment of the present invention. More particularly, a shadow map 420 is generated for the scene in image space. The shadow map 420 corresponds to the receiving point 460. Moreover, only one shadow map need be generated, as the shadow map is representative of depth values for all points in the scene in relation to the light source. That is, embodiments of the present invention are capable of generating shadows using a single shadow map 420. The shadow map is used for determining the depth of blockers for particular receiving points in the scene.

Thereafter, for each texel in a region of the shadow map corresponding to the receiving point 460, the present embodiment determines a depth value indicating whether light is occluded. For instance, a region 425 is shown within which the depths of texels are calculated to determine the depth of any potential blockers that block light from the light source 410 from reaching the receiving point 460. The search region 425 depends on the size of the light source 425 and the distance to the light from the shadow map.

In one embodiment, the search region 425 is estimated to further increase efficiency when calculating the shadow effect on a point. That is, rather than determine exactly the size of the search region 425, the region 425 is quickly estimated.

For example, as shown in FIG. 4, region 425 of shadow map 420 is searched to determine depth values that are closer to the light source 410 than the receiving point 460. More particularly, depth values are averaged for the region 425, in accordance with one embodiment. That is, only depth values that indicate the light is occluded in the region 425 are averaged to determine the average depth of the potential blocker 430.

Also, the eye 450 represents the viewpoint of a camera that is viewing the scene, and in particular the point 460. The viewpoint of the camera from the eye 450 is represented by pixels as shown on a display.

Embodiments of the present invention are presented in a parallel plane environment. That is, the area light source 410 is defined as a planar light source. Also, the receiver 440 is defined as a receiving plane. In addition, the blocker 430 is illustrated as a planar surface. In one embodiment, the planar light source, the surface of the blocker 430, and the receiving plane 440 are positioned in parallel with respect to each other.

FIG. 5 is a diagram 500 illustrating how the size of the corresponding penumbra to a point is determined. As shown in FIG. 5, the light source 410, the blocker 430 and the receiver 440 are shown. The penumbra 510 around the receiving point 460 is also shown. In particular, the size or width of the penumbra ($w_{penumbra}$) is a function of the size of the light source 410 ($w_{light}$), the depth of the blocker ($d_{blocker}$) and the depth of the receiver ($d_{receiver}$).

The width of the light source ($w_{light}$) is readily available. For instance, $w_{light}$ is provided as a user input when developing the scene in the image space. In addition, in one embodiment, the size of the light source is provided to the shader in one embodiment.

The distance to the receiver ($d_{receiver}$) is also previously obtained. That is, $d_{receiver}$ is typically calculated when generating the shadow map, as described above.

The distance to the blocker ($d_{blocker}$) has been previously described in relation to operation 310 of FIG. 3 and FIG. 4, in combination. That is, $d_{blocker}$ has been generated by averaging the depth values that indicate the light is occluded in a region corresponding to a point to determine $d_{blocker}$, or the average depth of the potential blocker.

As a result, the present embodiment is able to determine the width of the penumbra ($w_{penumbra}$) using the following equation:

$$w_{penumbra} = (d_{receiver} - d_{blocker}) * w_{light} / d_{blocker} \quad (1)$$

That is, the present embodiment subtracts the depth of the potential blocker from the depth of a receiver to the light to generate a first intermediate value. Then, the present embodiment multiplies the first intermediate value by the width of the light source to generate a second intermediate value. The width of the penumbra is determined by dividing the second intermediate value by the average depth of the blocker.

As described previously, the present embodiment scales a percentage closer filtering (PCF) kernel size in proportion to the width of the corresponding penumbra. By varying the filter size used in a percentage closer filtering process, degrees of softness in a shadow can be achieved. Scaling the PCF kernel size according to the size of the corresponding penumbra allows for an accurate representation of the shadow effect for a given pixel. As such, as the width of the penumbra increases, the PCF kernel size also increases. Also, as the width of the penumbra decreases, the PCF kernel size also decreases.

In one embodiment, the kernel size is varied by varying a filter width of the kernel size. In another embodiment, the kernel size is varied by increasing or decreasing the number of samples used in a kernel.

Figure 6:
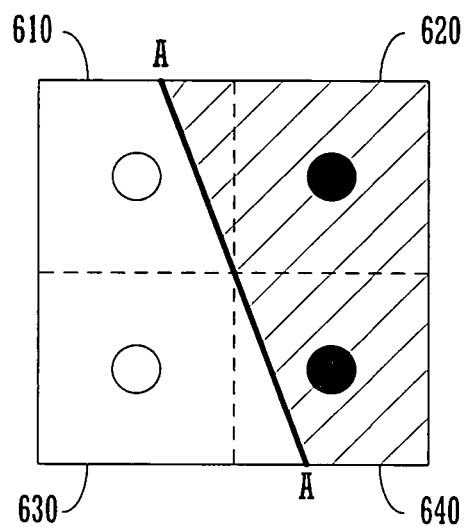
FIG. 6 is a diagram illustrating the percentage closer filtering technique used to generate shadowing for a pixel corresponding to a point in a scene in image space, in accordance with one embodiment of the present invention.

FIG. 6 is a diagram illustrating how percentage closer filtering is performed to determine the amount of shadowing needed at each pixel, in accordance with one embodiment of the present invention. FIG. 6 is shown as an illustration only of the process of performing PCF. As a result, the present embodiment is capable of returning a floating point value that indicates the amount of shadowing for each pixel displaying a scene in an image space.

As shown in FIG. 6, 4 texels are shown as a sample size when determining the amount of shading for a pixel. The example provided in FIG. 6 resulted in a four texel kernel size, as indicated by the corresponding width of a calculated penumbra.

Pixel 600 includes texels 610, 620, 630, and 640. To the right of line A--A, the pixel is shaded by occlusion, as shown by the darkened circle. To the left of line A--A, the pixel is illuminated by light from a light source, as shown by the lightened circle.

In the four sample PCF implementation, texels 620 and 640 are shaded, and texels 610 and 630 are unshaded, by way of illustration. That is, after performing 4 depth tests, the present embodiment determines that fifty percent of the pixel is shaded. As such, in the PCF implementation, the entire pixel would be shaded, or reduced in intensity from being fully lit, by fifty percent.

In the present embodiment, the previously determined width of the penumbra gives an indication as to how large the kernel size should be used. By varying the kernel size various degrees of softness can be achieved for the pixel. For instance, by increasing the kernel size to accommodate more than four texels in FIG. 6, the resulting shading factor would be less than 50 percent, resulting in a softer shadow. Correspondingly, by decreasing the kernel size to accommodate less than four texels in FIG. 6, the resulting shading factor would be more than 50 percent, resulting in a harder shadow.

Figure 7A:
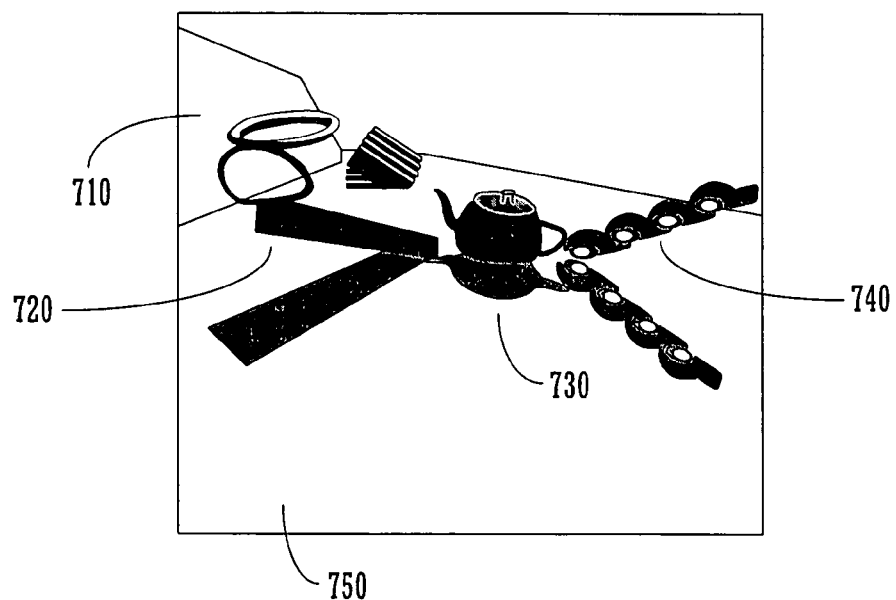
FIG. 7A is a diagram 700A illustrating the uniform application of hard shadowing of the images generated through a GPU.
Figure 7B:
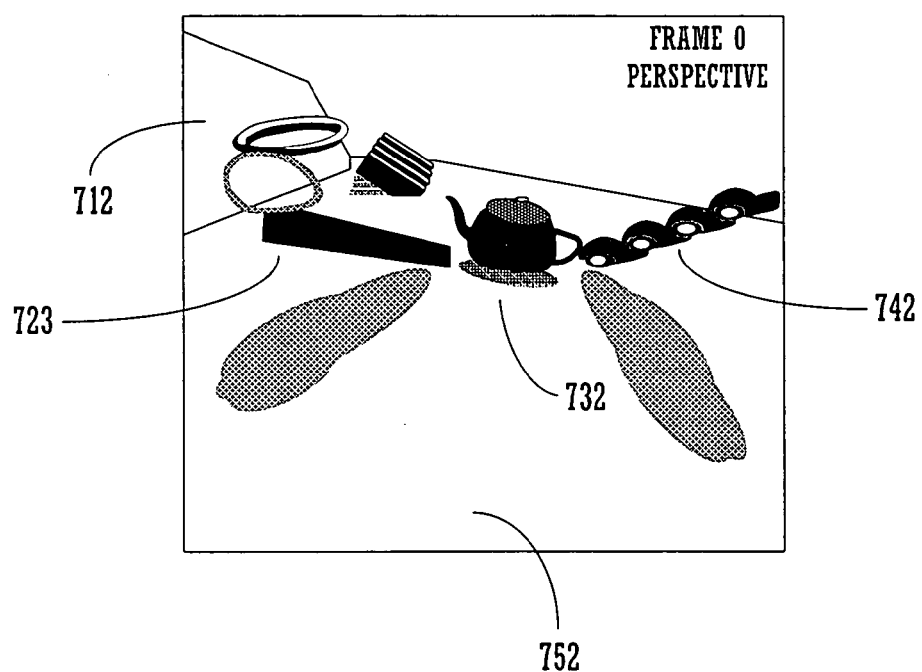
FIG. 7B is a diagram 700B illustrating the uniform application of soft shadowing of the images generated through a GPU.
Figure 7C:
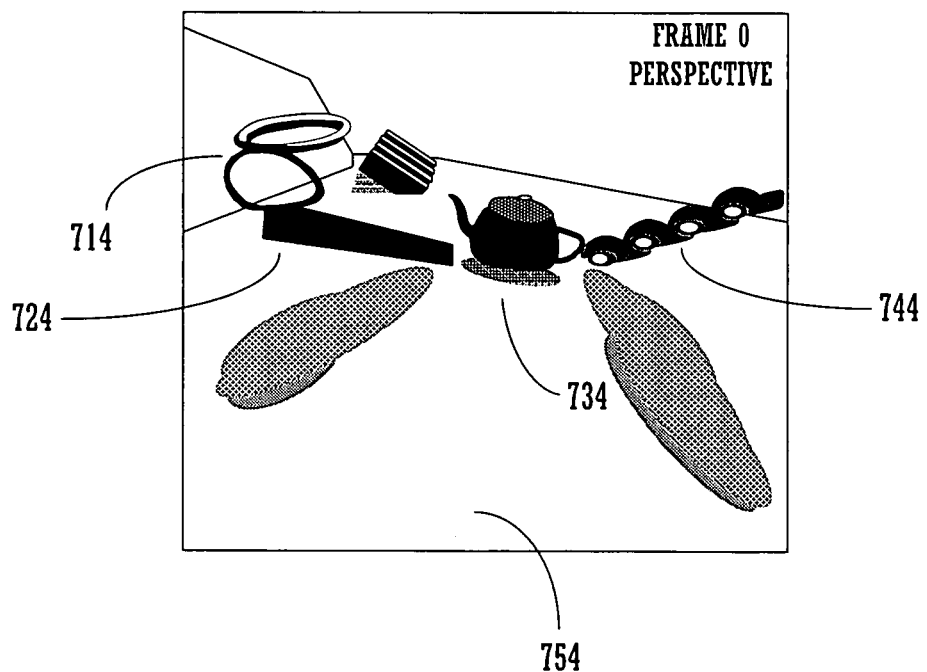
FIG. 7C is a diagram 700C illustrating the accurate application of shadowing of the images using percentage closer filtering techniques, in accordance with one embodiment of the present invention.

FIGS. 7A, 7B, and 7C illustrate the benefits and advantages of the percentage closer filtering techniques of embodiments of the present invention over conventional shadowing techniques. The shadowing of the present invention using percentage closer filtering techniques are able to provide perceptually accurate soft shadows for each of the images created by the GPU.

For example, FIG. 7A is a diagram 700A illustrating the uniform application of hard shadowing of the images generated through a GPU. That is, all the images have a hard shadow. For instance, the ring 710, the block 720, the teapot 730, and the lettering 740 each have a hard shadow. This is the case no matter where each image is in relation to a surface reflecting the shadow. As such, each of the ring 710, the block 720, the teapot 730, and the lettering 740 appear to touch the surface 750 even if they actually do not touch the surface 750. In particular, the shadowing of the lettering 740 is all hard, even as the relative position of the lettering 740 moves away from the reflective surface 750. As a result, it is difficult to achieve accurate positioning of images (e.g., ring 710, block 720, teapot 730 and the lettering 740) with relation to a surface 750.

FIG. 7B is a diagram 700B illustrating the uniform application of soft shadowing of the images generated through a GPU. That is, all the images have a soft shadow. For instance, the ring 712, the block 722, the teapot 732, and the lettering 742 each have a soft shadow. This is the case no matter where each image is in relation to a surface 752 reflecting the shadow. As such, each of the ring 712, the block 722, the teapot 732, and the lettering 742 appear to be close to touching the surface 752 even if they actually are touching, or are far away from the surface 752. In particular, the shadowing of the lettering 742 is all soft, even as the relative position of the lettering 740 moves towards and touches the reflective surface 750. As a result, it is difficult to achieve accurate positioning of images (e.g., ring 712, block 722, teapot 732 and the lettering 742) with relation to the surface 752.

FIG. 7C is a diagram 700C illustrating the accurate application of shadowing of the images using the percentage closer filtering techniques of embodiments of the present invention. For instance, each of the shades for the ring 714, the block 724, the teapot 734, and the lettering 744 have varying degrees of shadowing depending on the relative position of the ring 714, the block 724, the teapot 734, and the lettering 744 to the surface 754. As such, each of the ring 714, the block 724, the teapot 734, and the lettering 744 have perceptionally accurate positioning in relation to the surface 754. In particular, the shadowing of the lettering 742 varies depending on the relation of the part of the lettering 740 casting the shadow to the surface 754. As a result, embodiments of the present invention are able to achieve accurate positioning of images (e.g., ring 714, block 724, teapot 734 and the lettering 744) with relation to the surface 754.

Accordingly, the present invention provides, in various embodiments, a method and system for generating shadows in a graphics processing unit. The present invention provides for perceptually accurate soft shadows. Also, embodiments of the present invention utilize a combination of shadow mapping and percentage closer filtering techniques for generating the shadows that are suitable for a wide range of applications, from next-generation games to digital content creation (DCC) and computer aided design (CAD) applications. Embodiments of the present invention are capable of generating shadows using a single shadow map sample, and requires no special pre or post processing steps. As such, embodiments of the present invention are integrated easily into existing GPU systems by replacing existing shadow mapping shader code in applications. Additionally, embodiments of the present invention are capable of running in real-time on current consumer graphics hardware.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

What is claimed is:
1. A method of generating shadows, comprising:
discovering, in an electronic system, whether a potential blocker occludes light generated from a light source for a point of a scene in an image space;
determining a width of a corresponding penumbra for said point based on a width of said light source, an average depth of said potential blocker, and a depth of a receiver of said light;
scaling a percentage closer filtering (PCF) kernel size in proportion to said width of said corresponding penumbra, wherein said scaling comprises varying a filter width of said kernel size wherein said varying of said filter width varies degrees of softness of said shade of said point;
performing percentage closer filtering for said point using said kernel size to shade a pixel corresponding to said point, wherein said performing percentage closer filtering is operable to generate a perceptually accurate shadow; and
skipping said scaling said PCF kernel size and said performing percentage closer filtering by determining that said point is fully lit by said light.
2. The method of claim 1, wherein said discovering a potential blocker comprises:
generating a shadow map corresponding to said point;

for each texel in a region of said shadow map corresponding to said, point, determining a depth value indicating whether said light is occluded by said potential blocker; and averaging depth values for said region that indicate said light is occluded to generate said depth of said potential blocker.

3. The method of claim 2, further comprising:
estimating a size of said region.

4. The method of claim 2, further comprising:
determining that said light is not occluded by any potential blockers.

5. The method of claim 1, wherein said determining a width further comprises:

subtracting said depth of said potential blocker from said depth of a receiver of said tight to generate a first intermediate value;

multiplying said first intermediate value by said width of said light source to generate a second intermediate value; and dividing said second intermediate value by said depth of said blocker to determine said width of said penumbra.

6. The method of claim 1, further comprising:
determining said depth of a receiver of said light; and
determining said width of said light source.

7. The method of claim 1, wherein said scaling a PCF kernel size comprises:
varying the number of samples of said kernel size.

8. A method of generating shadows, comprising:
generating, in an electronic system, a shadow map corresponding to a point of a scene in an image space;

for each texel in a region of said shadow map, determining a depth value indicating whether light generated from a light source is occluded by a potential blocker;

averaging depth values for said region that indicate said light is occluded to generate an average depth of said potential blocker;

determining a width of a corresponding penumbra for said point based on a width of said light source, said average depth of said potential blocker, and a depth off a receiver of said light; and performing percentage closer filtering for a pixel corresponding to said point using a kernel size proportional to said size of said corresponding penumbra to shade said pixel corresponding to said point, wherein said percentage closer filtering comprises varying a filter width of said kernel size wherein said varying of said filter width varies degrees of softness of said shade of said pixel, and wherein said performing percentage closer filtering is operable to generate a perceptually accurate shadow; and skipping said using a kernel size and said performing percentage closer filtering by determining that said point is fully lit by said light.

9. The method of claim 7, wherein said performing percentage closer filtering comprises:
scaling said percentage closer filtering kernel size in proportion to said size of said corresponding penumbra.

10. The method of claim 8, wherein said scaling said percentage closer filtering kernel size further comprises:
increasing said kernel size when said width of said corresponding penumbra is larger; and
decreasing said kernel size when said width of said corresponding penumbra is smaller.

11. The method of claim 7, further comprising:
assuming said light source is planar;
assuming said potential blocker is planar and parallel to said light source; and
assuming said receiver is planer and parallel to said potential blocker.

12. The method of claim 7, wherein said determining a width of a corresponding penumbra comprises:

subtracting said average depth of said potential blocker from said depth of a receiver of said light to generate a first intermediate value;

multiplying said first intermediate value by said width of said light source to generate a second intermediate value; and dividing said second intermediate value by said average depth of said blocker to determine said width of said penumbra.

13. A computer system comprising:
a processor for processing information; and
a computer readable memory coupled to said processor and containing program instructions that, when executed cause said processor to implement a method of generating shadows, comprising:

discovering whether a potential blocker occludes light generated from a light source for a point of a scene in an image space;

determining a width of a corresponding penumbra for said point based on a width of said light source, a depth of said potential blocker, and a depth of a receiver of said light;

scaling a percentage closer filtering (PCF) kernel size in proportion to said width of said corresponding penumbra, wherein said scaling comprises varying a filter width of said kernel size wherein said varying of said filter width varies degrees of softness of said shade of said point, performing percentage closer filtering for said point using said kernel size to shade a pixel corresponding to said point, wherein said performing percentage closer filtering is operable to generate a perceptually accurate shadow; and skipping said scaling said PCF kernel size and said performing percentage closer filtering by determining that said point is fully lit by said light.

14. The computer system of claim 12, wherein said program instructions for discovering a potential blocker comprises additional program instructions that implement said method of generating shadows, wherein said additional program instructions further comprise:

generating a shadow map corresponding to said point;
for each texel in a region of said, shadow map corresponding to said point, determining a depth value indicating whether said light is occluded by said potential blocker; and averaging depth values for said region that indicate said light is occluded to generate said depth of said potential blocker.

15. The computer system of claim 13, further comprising additional program instructions that implement said method of generating shadows, wherein said additional program instructions further comprise:

determining that said light is not occluded by any potential blockers.

16. The computer system of claim 12, wherein said program instructions for determining a width further comprises additional program instructions that implement said method of generating shadows, wherein said additional program instructions further comprise:

subtracting said depth of said potential blocker from said depth of a receiver of said light to generate a first intermediate value;

multiplying said first intermediate value by said width of said light source to generate a second intermediate value; and dividing said second intermediate value by said depth of said blocker to determine said width of said penumbra.

17. The computer system of claim 12, further comprising additional program instructions that implement said method of generating shadows, wherein said additional program instructions further comprise:

determining said depth of a receiver of said light; and determining said width of said light source.

18. The computer system of claim 12, wherein said program instructions for scaling a PCF kernel size further comprise additional program instructions that implement said method of generating shadows, wherein said additional program instructions further comprise:

varying the number of samples of said kernel size.

\* \* \* \* \*